United States Patent Office 2,968,616
Patented Jan. 17, 1961

2,968,616

METHOD OF INHIBITING SCALE FORMATION BY NON-HYDROLYZING ORGANOPOLYSILOXANE

George G. Bernard, Crystal Lake, Ill., assignor to The Pure Oil Company, Chicago, Ill., a corporation of Ohio No Drawing. Filed Nov. 17, 1955, Ser. No. 547,557

4 Claims. (Cl. 210—58)

This invention relates to a method of inhibiting formation of scale on metallic and other solid surfaces which are continually in contact with hot water containing compounds which precipitate from the water and deposit on the metal surfaces.

Fresh water may have a hardness varying from 10 to 1800 parts per million, measured as calcium carbonate equivalent, and the majority of the fresh waters will fall in the range of 10 to 700 parts per million of hardness. Hardness is due to the presence of cations of calcium and magnesium, often present with bicarbonate and sulfate anions. Hardness in water causes scale-forming in steam boilers, water heaters, hot water piping and fixtures, heat exchangers, condenser jackets, and other equipment through which hot water is circulated, resulting in increased cost for fuel, labor, repairs and replacements. Water contains other scale-forming constituents such as silicon and aluminum salts. It is common practice in industrial and in domestic installations to soften water by treatment with mineral and organic zeolites which exchange their sodium or hydrogen for calcium, magnesium, iron and other objectionable cations present in the water. In industrial installations it is also common practice to precipitate out the scale-forming constituents or remove them by an absorption process. For example, silica is removed by an adsorptive process in which magnesium compounds are used or it may be precipitated out with ferric hydroxide. But there are many installations, both industrial and domestic, where treatment of the water is not practical, or is too expensive, and the water is used in the form in which it is obtained from rivers, wells, or other sources, with substantially its entire content of scale-forming constituents.

An object of this invention is to provide a method for inhibiting or preventing scale formation on surfaces continually exposed to hot water containing scale-forming compounds.

Another object of the invention is to inhibit or prevent scale formation on metallic or other surfaces exposed to hot water containing scale-forming compounds.

Other objects of the invention will become manifest from the following description.

I have discovered that the deposition of scale on metallic and other solid surfaces which come into frequent contact with heated water can be materially mitigated, and, if carefully controlled, scale deposition can be entirely eliminated by adding to the water, and/or maintaining on the metallic surfaces which come in contact with the water, organopolysiloxane resins, commonly known as silicone resins. Compounds useful in my invention are those which are normally liquid and fall within the lubricating oil viscosity range, or which have the consistency of soft waxes. In general, the silicone resins which are useful in my invention have the structure:

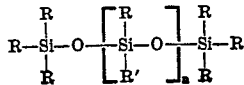

wherein R and R′ may be substituted or unsubstituted alkyl, aryl, arylalkyl, or cycloalkyl groups and $n$ is any whole number. As examples of compounds falling within the group may be mentioned dimethyl silicone polymer, phenylmethyl silicone polymer and chlorophenylmethyl silicone polymer. These compounds and their method of preparation are well-known, and may be found in Chemistry of The Silicones, by E. G. Rochow, published by John Wiley & Sons, Inc., New York, 1946. Likewise, dipropyl, dibutyl, diamyl, diphenyl, dixylyl and dinaphthyl silicone polymers may be used. The use of silicones which hydrolyze to precipitate silica should be avoided. Compounds of this type are the aryl and alkyl derivatives of silicane ($SiH_4$) in which at least one hydrogen atom has been replaced by an oxyalkyl or oxyaryl radical so that the alkyl or aryl radical is connected to a silicon atom through an oxygen bond. Compounds of this type fall within the general formula:

$$Si(OR)_nX_{4-n}$$

in which R is aryl or alkyl, X is H or other substituent such as Cl, OH or $NH_2$, and $n$ is a number from 1 to 4.

Soft, waxy-type polymers useful in accordance with my invention may be prepared by reaction, in the presence of a suitable catalyst, of an olefin such as ethylene, propylene or butylene with silicon fluoride at high pressure and slightly elevated temperatures. For example, a waxy material which softens at 87° C. and melts at 104° C. and which contains 0.55% silicon and 1.22% chlorine can be prepared by reacting 85 parts of silicon tetrachloride, 0.5 part of potassium chlorate and 0.1 part of manganese dioxide in an air-free atmosphere at a pressure of 900 atmospheres and a temperature of about 200° C. for about 14 hours. Pressure is maintained by admitting ethylene to the reaction mixture as required. The reaction product after washing with water, dissolving in xylene, filtering and precipitation with methanol, produces the desired product upon drying. In general, soft waxes useful in accordance with my invention can be produced by reacting a low molecular weight olefin with a silicon halide at pressures of 600 to 1000 atmospheres and temperatures of 75 to 300° C. In place of silicon tetrachloride may be used other silicon halides such as silicon tetrabromide, silicon fluoride, silicon fluorochloride and silicon halides in which one or more of the halogen atoms is substituted by one or more hydrogen, alkyl and/or aryl radicals, such as silicon trihydrogen chloride, triethyl silicon chloride, and triphenyl silicon fluoride.

Water-soluble silicones as well as oil-soluble silicones are useful and I contemplate use of both oil-soluble and water-soluble silicones alone or together.

Instead of, or in addition to, adding the silicone resin to the water, a thin film of the resin may be deposited on the metal surface by contacting the surface with a solution of the resin in an organic solvent which can be readily volatilized, such as benzene. For this purpose a solution of the resin in the solvent containing from 1 to 10% or higher amounts of the resin may be used.

It may be desirable both to form a coating of the resin on the metal surface and to continuously or intermittently add the polymer to the water in order to insure the presence of a thin film of mono-molecular proportion on the metal surface at all times. For example, the surface can be coated with a hydrocarbon-liquid- or oil-soluble silicone and a water-soluble silicone can be added to the water.

In order to demonstrate the invention, a condenser for the overhead gasoline stream from a catalytic cracking pilot unit, in which well water was passed through the condenser jacket to cool the vapors, was examined after the condenser had been in service for a period of 6 months. The interior of the condenser cooling jacket and the exterior surfaces of the tubes through which the gasoline vapors passed were examined and found to contain a coating of scale of approximately 1/16 inch thickness. The scale was removed and the unit was again put on stream, and during the ensuing 6 months of operation the same water was used for cooling purposes in the condenser, but polymethylsiloxane having a viscosity in the range of about 72.4 centistokes at 100° F. was added to the water so that all the water fed to the condenser jacket contained .01% of the polymer. At the end of the test period the interior of the condenser jacket and the tubes were again re-examined and there was scarcely any visible evidence of scale formation on either the jacket or tubes.

In order to insure adequate protection against scale formation, approximately 0.01 to 1% by weight of siloxane should be maintained in the water. Although satisfactory inhibition of scale formation is effected solely by coating the metal surface intermittently, in order to avoid the possibility of exposing the surface to scale-forming compounds I preferably maintain a small concentration of the siloxane in the water.

It will be seen, therefore, that I have provided a simple and economical method of inhibiting scale formation due to deposition of insoluble compounds from fresh water on metallic surfaces which are continually exposed to such water.

I claim:

1. The method of inhibiting formation of scale on a metallic surface in contact with frequent changes of hot water containing cations from the group consisting of calcium and magnesium comprising adding to said water prior to contact with said surface between 0.001 and 1% by weight of a substantially non-hydrolyzing organopolysiloxane resin of the formula:

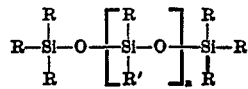

wherein R and R' are selected from the group consisting of substituted and unsubstituted alkyl, aryl, arylalkyl, and cycloalkyl radicals, and $n$ is any whole number, said resin having a consistency ranging from that of lubricating oils to that of soft waxes.

2. Method in accordance with claim 1 in which said metallic surface is thereby coated with a thin film of hydrocarbon-soluble, organic-siloxane resin.

3. Method in accordance with claim 1 in which the resin is polymethylsiloxane having a viscosity of about 72.4 centistokes at 100° F.

4. Method in accordance with claim 3 in which the resin is present in the water in the amount of 0.01% by weight.

References Cited in the file of this patent

UNITED STATES PATENTS

| | | |
|---|---|---|
| 997,281 | Ely | July 11, 1911 |
| 2,299,748 | Hatch | Oct. 27, 1942 |
| 2,375,007 | Larsen | May 1, 1945 |
| 2,523,281 | Currie | Sept. 26, 1950 |
| 2,587,636 | MacMullen | Mar. 4, 1952 |
| 2,632,736 | Currie | Mar. 24, 1953 |

OTHER REFERENCES

McGregor: "Silicones and Their Uses," McGraw-Hill, 1954, page 89.

McGregor: "Structure and Properties," vol. 46, No. 11, Ind. & Eng. Chem., November 1954, page 2323.

Industrial and Engineering Chemistry, January 1954, page 381.

Organic Coating Technology, vol. I, Payne, 1954, Wiley, pages 586–7.

Betz Handbook of Industrial Water Conditioning 1957, pages 96–99.